July 28, 1931.  T. H. RYAN  1,816,615
POWER TRANSMISSION DEVICE
Filed Aug. 18, 1930  3 Sheets-Sheet 1

INVENTOR.
THOMAS H. RYAN
BY
ATTORNEY

July 28, 1931. T. H. RYAN 1,816,615
POWER TRANSMISSION DEVICE
Filed Aug. 18, 1930 3 Sheets-Sheet 2
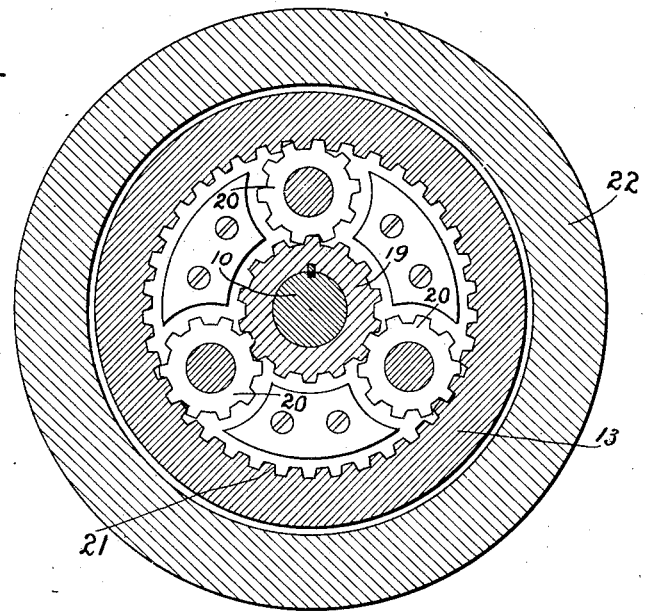
Fig-2-
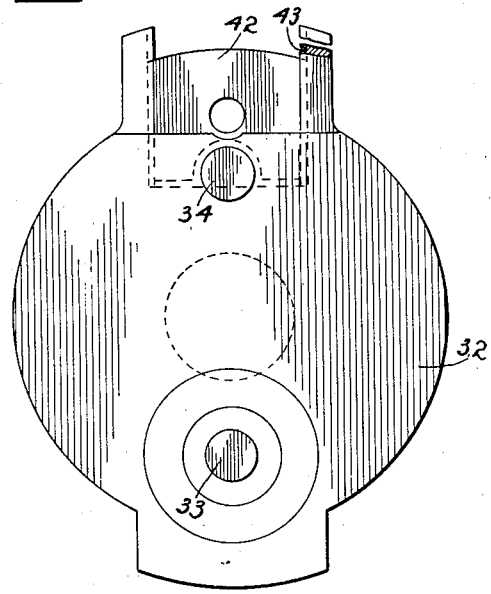
Fig-4-
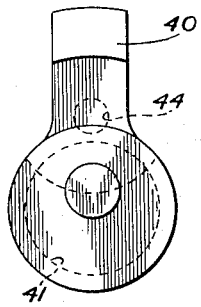
Fig-5-
INVENTOR.
THOMAS H. RYAN.
BY
ATTORNEY July 28, 1931. T. H. RYAN 1,816,615
POWER TRANSMISSION DEVICE
Filed Aug. 18, 1930  3 Sheets-Sheet 3
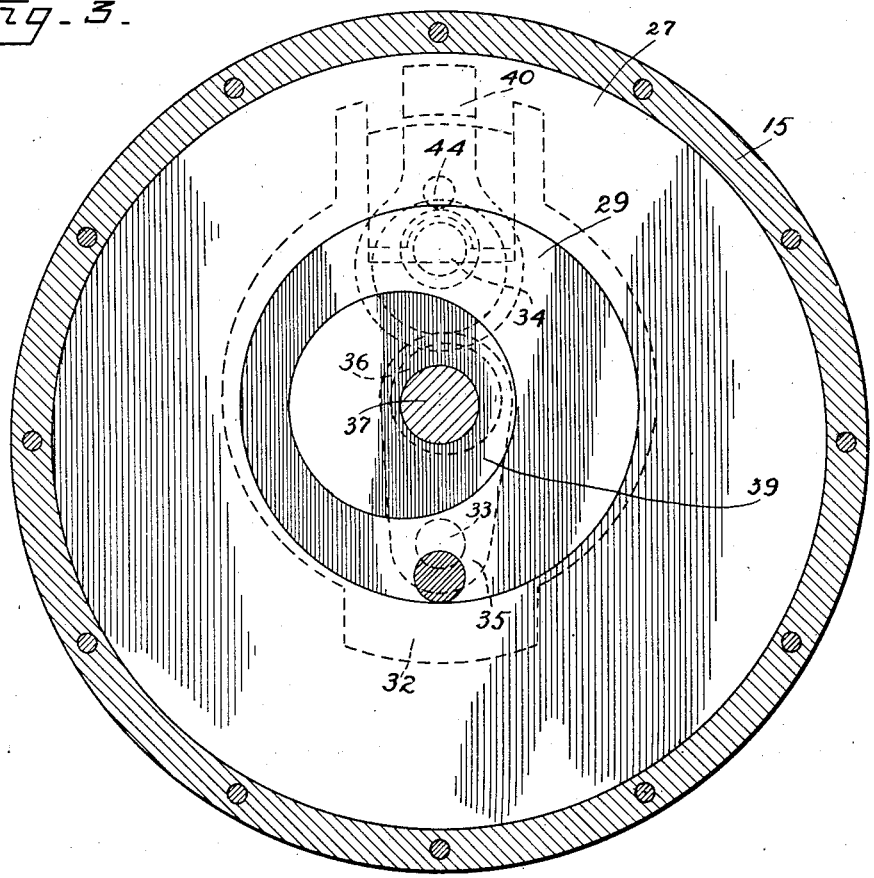
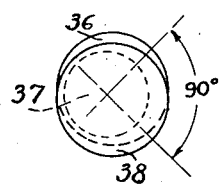
INVENTOR.
THOMAS H. RYAN.
BY
ATTORNEY Patented July 28, 1931

1,816,615

UNITED STATES PATENT OFFICE

THOMAS H. RYAN, OF SAN FRANCISCO, CALIFORNIA, ASSIGNOR OF ONE-SIXTH TO PAUL J. BOYENS AND ONE-SIXTH TO CHARLES J. McCARTHY, BOTH OF SAN FRANCISCO, CALIFORNIA

POWER TRANSMISSION DEVICE

Application filed August 18, 1930. Serial No. 475,894.

My present invention relates to power transmission, and involves a novel method and apparatus adapted for the transmission of power for various purposes and in various situations, especially where the load or speed is variable, for example, as with motor vehicles.

The general object hereof is to enable changes of speed ratio between the driving member or shaft and the driven member or shaft, not by any step by step adjustment, but by gradual or continuous changes through all intermediate ratios, and preferably from unity ratio down to zero speed of the driven shaft. Moreover the general plan is to secure a readjustment of the speed or ratio to correspond to the conditions or load in a self acting manner, without the manipulations of the usual clutch and gear shift, or other attention by the operator. Thus, for example, in the driving of a motor vehicle when the road conditions change the operation in that the speed ratio and torque will accommodate themselves so as to give the most effective results; whereby with any given conditions of resistance or load on the driven parts the maximum driven speed thereof will be attained which is consistent with the conditions of speed and power in the engine at the time, as determined by the throttle or otherwise.

If the vehicle should encounter an increase of grade, this increases the load on the driven shaft, thus slowing down the vehicle and the shaft; and this invention utilizes this slowing down, and the consequent increase of speed difference in the driving and driven members, to effect an alteration in the transmitting action such that the required increased torque is delivered, and without the need of attention by the operator. A great range of speed ratio and torque is permitted. When the load is sufficiently light the driven shaft may be rotated at the full speed of the driving shaft, or with a speed ratio of one to one, under which conditions the entire mechanism may rotate as a unit and there will be no play or internal motion of the parts of the transmission and consequently no wear. On the other hand, with increase of load, the ratio may decrease toward or substantially to zero. Control by the engine throttle is additional or supplemental to the self control of the transmission, and by manipulating the throttle the operator can at will increase or decrease the developed power, and speed up or slow down the engine and therefore the driven shaft, this being the only attention required for driving the vehicle under varying conditions.

The class of transmission to which the present invention relates is that in which the inertia of a mass or body in conjunction with the centrifugal force of a second mass or body movable about a common axis reacts to produce a variable torque arm through which the power is transmitted.

In construction the apparatus consists in the provision of a plurality of rotatable masses or bodies which are eccentrically disposed about a common axis and which may rotate freely about their particular axis, and a pair of oppositely disposed centifugal weights which operate to control the relative positions of the first referred to bodies about the common axis.

For a better understanding of my invention reference should be had to the accompanying drawings wherein I have shown by way of illustration and not of limitation a preferred embodiment thereof.

In the drawings wherein like numerals refer to like parts throughout the several views—

Figure 2 is a sectional view taken along line II—II of Figure 1 looking in the direction of arrows.

Figure 3 is a sectional view taken along line III—III of Figure 1 looking in the direction of arrows, Figures 4, 5 and 6 show details of different parts.

Figure 1:
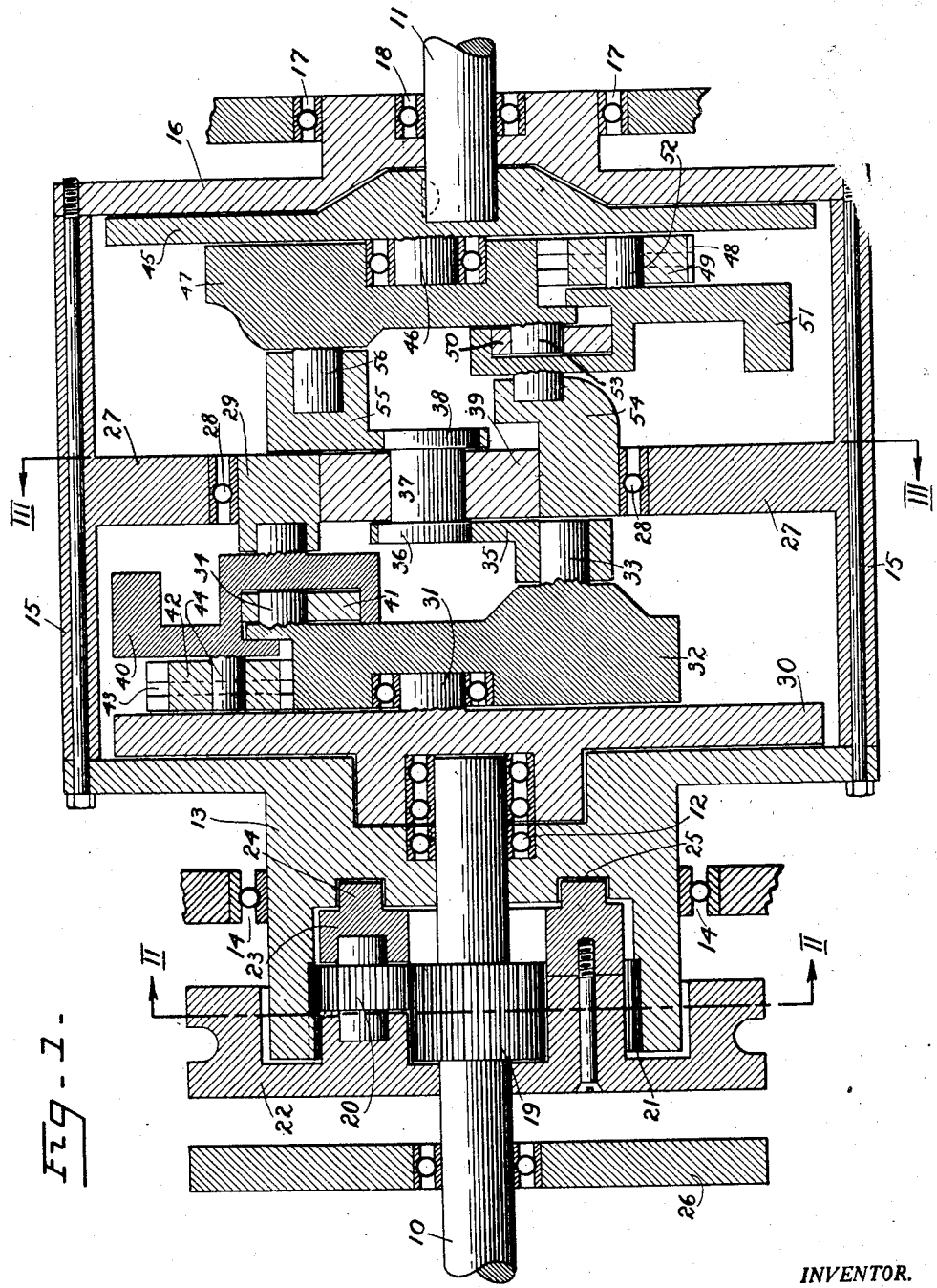
Figure 1 is a vertical sectional view taken along the axial center line.

Upon referring to the drawings it will be seen that my device is constructed so that it may be connected directly in a power transmitting shaft. This feature renders my device ideally suited to the transmission shaft of an automobile and I shall therefore describe its construction and operation in conjunction with such an application.

In Figure 1, I have illustrated my device as disposed between a driving shaft 10 of a gas engine and a driven shaft 11 which extends to the rear axle of the car. The inner end of the driving shaft 10 is supported upon a bearing 12 carried by an end member 13 and the end member 13 is in turn supported upon a second bearing 14 carried by the frame of the automobile. Cooperating with an annular flange upon the end member 13, I show a cylindrical housing 15 in which I locate the various moving parts of the device.

The housing 15 is secured between the end member 13 and a second end member 16 which is rotatably supported upon a suitable bearing 17. At this point the driven shaft 11 is shown projecting through the end member 16 and as supported upon a bearing 18 carried by this latter member. With this arrangement it will be seen that the end member 13, the housing 15 and the end member 16 are capable of rotation as a whole about and with the shafts 10 and 11.

In order to connect the end member 13 and its connected parts with the driving shaft 10 there is provided upon the shaft 10 a pinion 19 which meshes with the planetating gears 20 disposed within an internal ring gear 21, the teeth of which are cut upon the end member 13. The planetating gears 20 are provided with stub shafts and are thus held in place in spaced relation between a thrust collar 22 and a clutch member 23. It will be noted that the length of the pinion 19 and the length of the teeth of the ring gear 21 are such that the gears 20 may be moved axially along the shaft 10 without becoming disengaged. It will also be noted that the clutch member 23 is provided with radially disposed tongues 24 which, when the parts are in the positions shown, will engage corresponding recesses 25 in the end member 13.

When the parts are positioned as shown there will be formed a direct driving connection between the driving shaft 10 and the end member 13 and as a result the end members 13 and 16, and the housing member 15 will rotate with the shaft 10. Under these conditions the torque exerted by shaft 10 will be transmitted through the pinion 19 and gears 20 to the clutch member 23 and thence to the member 13 through the tongues 24. With this latter arrangement of the parts the device will operate to drive the load in the forward direction and the shaft 11 will be caused to turn in the same direction as the shaft 10. If it is now desired to reverse the direction of rotation of shaft 11 this can be done by moving the thrust collar 22, the planetating gears 20 and the clutch plate 23 to the left. This will disengage the tongues 24 from the recesses 25 and will establish a driving connection through the gears 20 which, when held against movement about the shaft 10, will impart a reverse movement to the end member 13 and its connected parts.

In order to hold the planetating gears 20 and the thrust collar 22 against rotation about the shaft 10 when in the reverse position, I show a stationary friction plate 26 against which the collar 22 may be pressed with sufficient force to hold it stationary. Under these latter conditions it will be seen that as the planet gears 20 are driven by the pinion 19 they will impart a movement to the end member 13 which will be opposite to that of the driving shaft 10. By referring to Figure 2 it will be seen that the planetating gears 20 are three in number and are spaced equally about the shaft 10.

The internal mechanism of my device, as shown in Figure 1, is disposed between the end members 13 and 16, and comprises substantially similar elements which are disposed on opposite sides of an inwardly projecting web 27 formed upon the housing member 15. The web 27 carries an eccentrically disposed roller bearing 28 in which a disk member 29 may freely turn. For the purpose of this explanation I shall refer to those elements to the left of the web 27 as on the driving side thereof and those elements on the right of the web 27 as on the driven side thereof. Located upon the driving side of the web 27 and journaled concentrically within the housing 15 and upon the end of the shaft 10, I show a member 30 upon which a crank shaft 31 is formed. The crank shaft 31 carries an inertia storing mass or body member 32. This latter member is provided with crank shafts 33 and 34 which are disposed on opposite sides of its center of rotation. Extending from the crank shaft 33 there is a link 35 which engages an eccentric disk 36 formed upon the end of a central shaft 37. This central shaft 37 carries a second eccentric disk 38, to be hereinafter referred to, and is journaled eccentrically in a rotatable disk member 39 which, under one condition of operation may as shown assume a position where its outer circumference will be concentric with the shafts 10 and 11. This latter disk member 39 is carried by and is freely movable in the disk member 29.

On the driving side of the disk member 29 there is pivotally mounted an oscillating weight or mass 40 which engages the member 32 through an adjustable collar 41 carried by the crank shaft 34 and a sliding block 42 which slides freely between radially disposed guide trackways 43 formed upon the member 32. The sliding block is attached to the weight member 40 by a stub shaft 44 which projects from the weight 40.

In Figure 3, I have for the purpose of simplifying the drawing omitted the details of the roller bearing 28 and have shown only a single line indicating the circumference of the member 29. From an inspection of this figure of the drawings it will be seen, because of the eccentric disposition of the member 29 in the web 27 and a similar disposition of the disk 39 in the member 29, that the shaft 37 may float, so to speak, and assume positions in different degrees of eccentricity with respect to the shafts 10 and 11, and the housing 15. This figure of the drawings also shows in dotted lines the relative position of the member 32 when the shaft 37 is in its position of maximum eccentricity. It will be also noted that under these conditions the oscillating weight 40, as shown in dotted lines, will be in its outermost or central and most effective position.

By referring back to Figure 1 of the drawings it will be seen that there is a disk member 45 keyed upon the end of the shaft 11 which has a crank shaft 46 for rotatably supporting an energy storing mass or body member 47. The energy storing mass 47, like the previously described member 32, is provided with guide-ways 48 between which a sliding block 49 moves. The sliding block 49 serves in conjunction with an eccentric collar 50 to connect the energy storing mass 47 to an oscillating centrifugal weight 51. The sliding block 49 is shown as controlled by a stub shaft 52 projecting from the weight 51 and the collar 50 is carried by a stub shaft 53 upon the member 47. The oscillating centrifugal weight 51 is shown as journaled upon a boss 54 formed upon the member 29 diametrically opposite the weight 40 and a link 55 connects the central shaft 37 with its eccentric disk 38 to a stub shaft 56 upon the body member or mass 47.

By referring to Figures 4 and 5 in conjunction with Figure 1 of the drawings it will be seen that when the weight 40 oscillates about its pivotal connection upon the member 29 it will produce an angular displacement between the member 29 and the member 32. This will cause the sliding block 42 to move radially toward and away from the center of rotation and at the same time the collar 41 will rotate around the stub shaft 34 so as to permit the above displacement.

Upon referring to Figure 6 it will be seen that the eccentric disks 36 and 38 upon the central shaft 37 are disposed at a right angle to each other. As illustrated the disk 38 is disposed along a center line 45° below the horizontal, and the disk 36 is disposed along a line 45° above the horizontal center line of the view. In Figures 1 and 3 of the drawings this shaft 37 is disposed in the same position as shown in Figure 6.

The operation of my device is as follows:

If it is assumed that the shaft 10 is rotated clockwise when viewed from the left of Figure 1 of the drawings, the top of the housing 15 will move toward the observer. This will result in a movement of the web 27 with its bearing 28 in the same direction, but the bearing 28 and the supported disk 29 will remain eccentric with the axis of the shafts 10 and 11. As the disk member 29 turns about the axis of the shafts 10 and 11 it will exert a torque upon the inertia members 32 and 47 through the oscillating weights 40 and 51 respectively and these inertia members will be angularly displaced in opposite directions with respect to the member 29. As this angular displacement takes place the links 35 and 55 will transmit torque to the central shaft 37 which acting as a fulcrum will cause the eccentric disk 39 to rotate within the member 29 and tend to bring the shaft 37 into axial alignment with the shafts 10 and 11.

When the members 32 and 47 pick up sufficient speed, the oscillating centrifugal weights 40 and 51 will be thrown outwardly to a central position which will tend to bring the members 32 and 47 back into opposed alignment, as illustrated in Figure 1. During the period the weights 40 and 51 are operating as above, the driven shaft 11 will assume the load thereupon and pick up speed as the load is overcome. As the device operates from the starting position to full speed of the shaft 11, the shaft 37 will assume different positions between a point concentric with the shafts 10 and 11 and a point where a maximum crank eccentrically exists, or for instance to the position illustrated in Figures 1 and 3. When the shaft 37 has assumed this latter position, the internal mechanism of my device will rotates as a whole with the housing 15 and thus establish a direct connection between the shafts 10 and 11.

While I have, for the sake of clearness and in order to disclose my invention so that the same can be readily understood, described and illustrated specific devices and arrangements, I desire to have it understood that this invention is not limited to the specific means disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is—

1. In a power transmission device, the combination of a driving shaft, a driven shaft, a support rotatably mounted in alignment with said driving and driven shafts, means for connecting said support to said driving shaft whereby it will rotate therewith, oppositely disposed weights mounted upon shafts eccentric to said driving and driven shafts, one of said weights being connected with the driven shaft, and a floating connection between said weights journaled upon said support and normally eccentric with said driving and driven shafts adapted to transmit the torque exerted by the driving shaft to said driven shaft as said oppositely disposed weights rotate with respect to each other to vary the eccentricity of said floating connection.

2. In a power transmission device, the combination of a driving shaft, a driven shaft, a support rotatably mounted in alignment with said driving and driven shafts, means for connecting said support to said driving shaft whereby it will rotate therewith, a pair of oppositely disposed weights mounted upon shafts eccentric to said driving and driven shafts, one of said weights being connected with the driven shaft, and a floating crank connection between said weights journaled upon said support and normally eccentric with said driving and driven shafts adapted to transmit the torque exerted by the driving shaft to said driven shaft as said oppositely disposed weights rotate with respect to each other to vary the eccentricity of said floating connection.

3. In a power transmission device, the combination of a driving shaft, a driven shaft, a support rotatably mounted in alignment with said driving and driven shafts, means for connecting said support to said driving shaft whereby it will rotate therewith, a pair of weights mounted upon shafts eccentric to said driving and driven shafts, one of said weights being connected with the driven shaft, and a connection between said weights journaled upon said support normally eccentric with said driving and driven shafts adapted to transmit the power exerted by the driving shaft to said driven shaft as said oppositely disposed weights move with respect to each other and vary the eccentricity of said floating connection.

4. In a power transmission device, the combination of a driving shaft, a driven shaft, a cylindrical housing rotatably mounted between and axially in alignment with said driving and driven shafts, a plurality of eccentrically disposed rotatable weights within said housing, and a floating crank shaft journaled within said cylindrical housing and connected between said weights adapted to float from a position concentric with the driving and driven shafts to a position eccentric therewith as the speed of said driven shaft increases.

5. In a power transmission device, the combination of a driving shaft, a driven shaft, a cylindrical housing rotatably mounted between and axially in alignment with said driving and driven shafts, a plurality of eccentrically disposed rotatable weights within said housing, and a floating crank connection between said weights adapted to float from a position concentric with the driving and driven shafts to a position eccentric therewith as the speed of said driven shaft increases.

6. In a variable power transmission device, the combination of a driving shaft, a driven shaft, a housing adapted to be disposed in axial alignment between said driving and driven shafts, means for connecting said housing with the driving shaft, means within said housing connected with said driven shaft, a plurality of inertia bodies eccentrically disposed within said housing, an eccentrically disposed rotatable member between said bodies, a floating crank shaft carried by said last member, a pair of oppositely disposed links for connecting said inertia bodies with said crank shaft which will determine its eccentricity as said inertia bodies move with respect to each other, and centrifugally responsive weights carried by said eccentrically disposed member and connected with said inertia bodies for controlling their relative displacement and the eccentricity of said crank shaft, whereby a variable torque will be transmitted from said driving shaft to said driven shaft as said floating crank shaft floats from one degree of eccentricity to another under the influence of said inertia bodies.

7. In a variable power transmission device, the combination of a driving shaft, a driven shaft, a housing adapted to be disposed in axial alignment between said driving and driven shafts, means for connecting said housing with the driving shaft, means within said housing connected with said driven shaft, a plurality of rotatable inertia bodies eccentrically journaled within said housing, an eccentrically disposed rotatable member between said bodies, a floating crank shaft carried by said last member, a pair of oppositely disposed links for connecting said inertia bodies with said crank shaft to determine its eccentricity as said inertia bodies rotate with respect to each other, and centrifugally responsive weights carried by said eccentrically disposed member and connected with each of said inertia bodies for controlling their movement and the eccentricity of said crank shaft, whereby a variable speed will be transmitted to said driven shaft as said floating crank shaft floats from one degree of eccentricity to another under the influence of said inertia bodies.

8. In a variable power transmission device, the combination of a driving shaft, a driven shaft, a housing adapted to be disposed in axial alignment between said driving and driven shafts, means for connecting said housing with the driving shaft, means within said housing connected with said driven shaft, a plurality of inertia bodies eccentrically disposed within said housing, a floating crank shaft carried by said housing, a pair of oppositely disposed links for connecting said inertia bodies with said crank shaft which will determine its eccentricity as said inertia bodies move with respect to each other, and centrifugally responsive weights connected with said inertia bodies for controlling their relative displacement, whereby a variable torque will be transmitted through said inertia bodies to said driven shaft as said floating crank shaft floats from one degree of eccentricity to another under the influence of said inertia bodies.

THOMAS H. RYAN.